United States Patent [19]
Yanagida et al.

[11] 4,179,496
[45] Dec. 18, 1979

[54] FIBROUS CRYSTALLINE POTASSIUM TITANATE AND PROCESSES FOR PREPARING FIBROUS POTASSIUM TITANATES

[75] Inventors: Hiroaki Yanagida, Kashiwashi; Tadao Shimizu, Tachikawashi; Yasuo Nishikawa, Okayamashi, all of Japan

[73] Assignee: Kyushu Refractories Co., Ltd., Japan

[21] Appl. No.: 826,534

[22] Filed: Aug. 22, 1977

[30] Foreign Application Priority Data

Aug. 23, 1976 [JP] Japan .................................. 51-100453
May 6, 1977 [JP] Japan .................................. 52-51815

[51] Int. Cl.$^2$ ............................................. C01G 23/00
[52] U.S. Cl. .................................................... 423/598
[58] Field of Search ........................................ 423/598

[56] References Cited

U.S. PATENT DOCUMENTS

| | | | |
|---|---|---|---|
| 2,841,470 | 7/1958 | Berry | 423/598 |
| 4,041,143 | 8/1977 | Fujiki et al. | 423/598 |
| 4,064,224 | 12/1977 | Kawamata et al. | 423/598 |

FOREIGN PATENT DOCUMENTS 51-49924  4/1976  Japan ........................................ 423/598

OTHER PUBLICATIONS

Shimizu et al., "Yogyo-Kyokai-Shi", vol. 83, 1975, pp. 305–311.

*Primary Examiner*—Herbert T. Carter
*Attorney, Agent, or Firm*—Philip M. Hinderstein

[57] ABSTRACT

A novel noncrystalline fibrous potassium titanate and a process for preparing said titanate fiber by calcination of a mixture of potassium compound(s) and titanium compound(s) at a temperature of from 800° C. to the melting point of the mixture to obtain whiskers formed on the surface thereof; and an improved process for preparing fibrous potassium hexatitanate which comprises calcining hydrated fibrous potassium titanate at a temperature of 500° to 900° C. or which comprises kneading a mixture of potassium compound(s) and titanium compound(s), and calcining the thus kneaded mixture at a temperature of 1150° to 1300° C. to obtain fibers from the inside of the bulk of the calcined mixture are described.

3 Claims, 7 Drawing Figures

FIBROUS CRYSTALLINE POTASSIUM TITANATE AND PROCESSES FOR PREPARING FIBROUS POTASSIUM TITANATES

BACKGROUND OF THE INVENTION

1. Field of the Invention

This invention relates to artificial mineral fibers or whiskers having excellent heat insulating properties, heat resistance, fire resistance, and chemical resistance, and processes for preparing the same. More particularly, this invention relates to a novel fibrous potassium titanate having a noncrystalline or amorphous structure and a simple process for preparing the said titanate fibers in which a mixture of potassium compound(s) and titanium compound(s) is kneaded and calcined.

2. Description of the Prior Art

Fibrous potassium titanates have long attracted attention as artificial mineral fibers having excellent heat insulating properties, chemical resistance, and heat and fire resistance. The chemical composition of these products is represented by the general formula $K_2O.nTiO_2$ wherein n has a value of 2.5 to 8. Among these products, fibrous potassium tetratitanate and potassium hexatitanate of the formulas $K_2O.4TiO_2$ and $K_2O.6TiO_2$, respectively, show particularly excellent heat insulation and heat, tire, and chemical resistance which makes them good thermo and chemical insulators.

We have investigated the hydrothermal synthesis of fibrous potassium titinates, see Yogyo-Kyokai-Shi, 76, 207 (1968). ibid., 83, 305(1975), the disclosure of which is herein incorporated by reference.

Several processes for preparing fibrous potassium titanates are known. U.S. Pat. No. 2,833,620, discloses a process which comprises reacting a potassium compound and a titanium compound in the presence of water at a temperature of at least 400° C. under a pressure of at least 200 atmospheres. On the other hand, U.S. Pat. No. 2,841,470 discloses a process which comprises dissolving a non-fibrous potassium titanate in a fused alkali metal salt, maintaining a portion of the molten salt saturated with the dissolved compound to form the fibrous potassium titanate and then separating the crystallized titanate fibers from the salt by water extraction. Further, U.S. Pat. No. 3,328,117 discloses a method for producing a fibrous, water-insoluble alkali metal titanate which comprises calcining and reacting under essentially dry, non-fluid conditions a previously dry-blended nodular compacted mixture of an alkali metal compound with a titanium compound at a calcination temperature of 200° to 1150° C., leaching the thus obtained product to remove undesired substances therefrom, and then filtering, exfoliating, drying, and recovering the desired fibrous alkali titanate product. However, according to all of the U.S. patents mentioned above, the fibrous products obtained were shown from the X-ray diffraction patterns thereof to possess crystalline structures. Furthermore, the fibers of potassium titanate disclosed in the specifications of these U.S. patents are relatively short and the ratio of length to diameter of the fibers is low. Hence, these fibrous products still can not be made into paper-like articles utilizing water collection processes such as that used in the manufacturing of paper.

SUMMARY OF THE INVENTION

According to the present invention, these problems are solved by providing a (i) a novel fibrous potassium titanate having a noncrystalline or amorphous structure, (ii) a simple process for preparing the noncrystalline titanate fibers in which a mixture of potassium compound(s) and titanium compound(s) is kneaded and calcined at a temperature of from 800° C. to the melting point of the mixture to obtain whiskers produced on the surface thereof, (iii) and an improved process for preparing fibrous potassium hexatitanate of the formula $K_2O.6TiO_2$ which comprises calcining hydrated fibrous potassium tetratintanate prepared via the process mentioned above at a temperature of 500° to 900° C. or by kneading a mixture of potassium compound(s) and titanium compound(s) and calcining the thus kneaded mixture at a temperature of 1150° to 1300° C. to obtain fibers of potassium hexatitanate from the inside of the bulk of the calcined mixture.

OBJECTS

It is therefore an object of the present invention to provide a novel fibrous potassium titanate having a noncrystalline or amorphous structure.

It is a further object of the present invention to provide a novel fibrous potassium titanate having a higher ratio of length to diameter for the fibers or whiskers than those of the fibers produced according to the conventional methods.

It is a still further object of the present invention to provide the novel fibrous noncrystalline potassium titanate mentioned above which can be utilized to prepare novel crystalline titanate dioxide as described in our accompanying application entitled Fibrous Titanium Dioxide And Processes For Preparing The Same, the disclosure of which is hereby incorporated by reference.

It is another object of the present invention to provide improved processes for preparing potassium hexatitanate of the formula $K_2O.6TiO_2$.

It is still another object of the present invention to provide a novel fibrous potassium titanate hydrate having a crystalline structure of the formula $2K_2O.11TiO_2.2H_2O$.

It is still another object of the present invention to provide heat insulating and chemically resistant fibrous products which can be collected in water as in paper-manufacturing to form a cloth or a plate.

Still other objects, features, and attendant advantages of the present invention will become apparent to those skilled in the art from a reading of the following detailed description of the preferred embodiment constructed in accordance therewith, taken in conjunction with the accompanying drawings.

DESCRIPTION OF THE PREFERRED EMBODIMENTS

Figure 1:
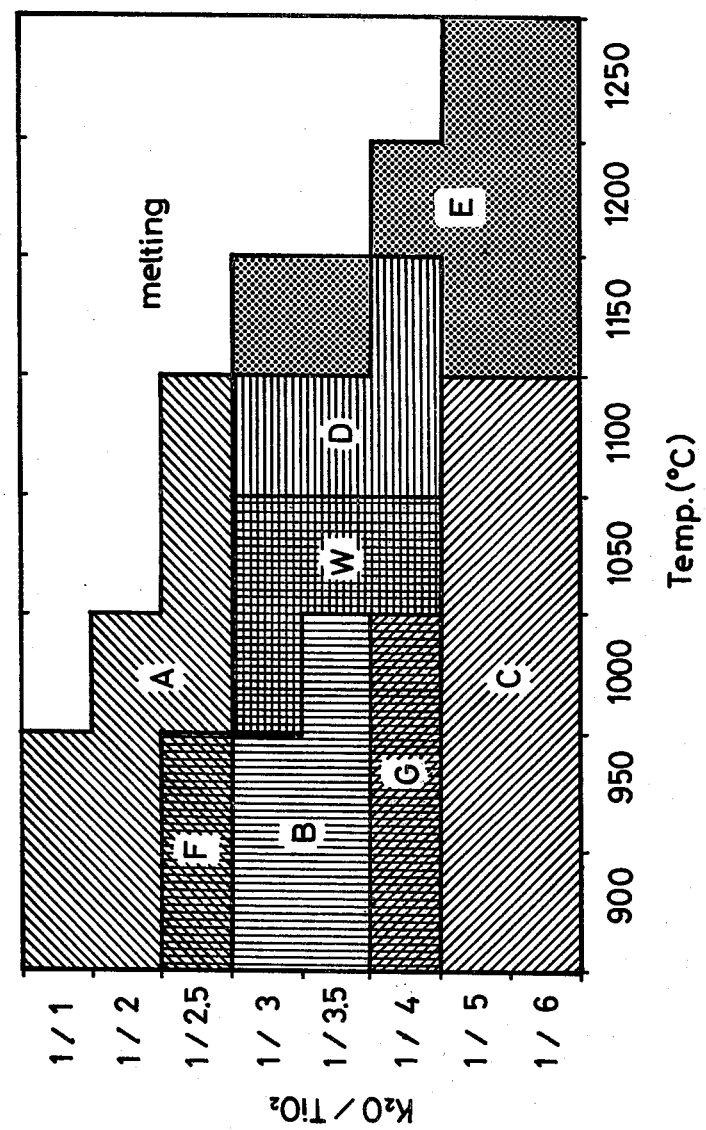
FIG. 1 is a phase map of products.

The novel fibrous potassium titanate of this invention is a noncrystalline or amorphous product, the composition of which is represented by the formula $K_2O.nTiO_2$ wherein n has a value of 2.5 to 8. The noncrystalline or amorphous nature of the present product is shown by the lack of a clear pattern in its X-ray diffraction spectra. The fibrous product of this invention has a ratio of length/diameter of above 10 and according to the process which will be described hereinafter, this ratio may be increased up to 1700. In the formula $K_2O.nTiO_2$ mentioned above, n is variable depending upon the ratio of the blended raw materials, calcination conditions, etc., and represents a value of 2.5 to 8 preferable 2.5 to 6.

The novel fibrous noncrystalline potassium titanate is prepared by the following procedure. One or more potassium compounds selected from the group consisting of potassium carbonate, potassium hydroxide, potassium sulfate, potassium nitrate and potassium chloride, and one or more titanium compounds selected from the group consisting of titanium dioxide and titanium hydroxide are blended or kneaded and formed into lumps or pellets. The ratio of potassium compound and titanium compound to be blended should be selected so that the ratio of potassium atom to titanium atom is between the range of 2:2.5 to 2:8, and preferably between the range of 2:3 to 2:4. The lumps or pellets thus prepared are then calcined at a temperature of from 800° C. to the melting point of the blended mixture, preferably from 950° to 1150° C. During the calcination, the surface of the lumps or pellets should not be disturbed and should be kept flawless. Whiskers or fibers produced on the surface are recovered therefrom after calcination. The remaining part of the calcined lumps or pellets may be used for still a further embodiment of the invention, which will be described hereinafter. In order to obtain the whiskers or fibers in high yield, it is preferred to form, before calcination, the blended mixture of raw materials into lumps or pellets having a large surface area.

The whisker or fiber prepared according to the present process is greater than 5 mm in length and about 3 $\mu$m in diameter. Hereinbefore it was not possible to prepare a whisker or fiber of this length by conventional methods.

On investigation of the remaining part of the calcined lumps or pellets from which whiskers or fibers were removed, it was observed that fibrous potassium tetratitanate of the formula $K_2O.4TiO_2$, which is crystalline and of a relatively short length, was formed inside the bulk of the remaining lumps or pellets. When the calcination is conducted sufficiently to grow the whiskers, the potassium tetratitanate formed inside the pellets is of a high purity. When the fibrous potassium tetratitanate thus formed inside the pellets is placed into water under normal atmospheric pressure for 30 minutes to 96 hours, preferably for 18 to 36 hours, a fiber of crystalline potassium titanate hydrate whose formula is $2K_2O.11TiO_2.2H_2O$ is obtained. This fiberous product is also a novel product which has never been disclosed or used in the prior art and can be used as an intermediate for further chemical reactions. Thus the fibrous $2K_2O.11TiO_2.2H_2O$ is treated at a temperature of 500° to 900° C., preferably 800° to 900° C., which yields a crystalline fiber of potassium hexatitanate of the formula $K_2O.6TiO_2$ in an extremely high purity.

A crystalline fiber of potassium hexatitanate can also be prepared by the following process. Namely, a mixture of one or more potassium compounds and one or more titanium compounds with a molar ratio of $K_2O/TiO_2$ of between 1:3 to 1:6, preferably between 1:5 to 1:6 is kneaded and calcined for 30 minutes to 1000 hours, preferably for 12 to 24 hours at a temperature of between 1150° and 1300° C., preferably between 1150° and 1250° C. to form fibrous potassium hexatitanate inside the bulk of the calcined mixture. As candidates for the potassium compound may be mentioned potassium carbonate, potassium hydroxide, potassium sulfate, potassium nitrate, and potassium chloride. As candidates for the titanium compound may be mentioned titanium dioxide and titanium hydroxide. When prepared according to this procedure, fibrous potassium hexatitanate can readily be obtained in a high yield. The thus obtained product may be used for heat insulation, heat resistant material, pigment, filler of plastics, cement composite, and the like.

In the course of the production thereof, potassium carbonate and other potassium compounds used as starting materials in the present invention are often contaminated with an alkali metal salt such as sodium salt, etc. Hence, potassium compounds for industrial use usually contain small amounts of such alkali metal salts. However, the present process is shown not to be influenced by the presence of such a contamination, thereby rendering it valuable for practical industrial use.

Referring to FIG. 1, the product phases are shown on a phase map whose lateral axis is the cintering temperature and whose longitudinal axis is molal ratio of potassium oxide to titanium dioxide ($K_2O/TiO_2$).

In phase A of FIG. 1, the yield is non-crystalline but it is not fibrous.

In phase B, the yield is not fibrous and $K_2O.2TiO_2$ is recognized.

In phase C, rutile-type titanium dioxide which has not reacted is left.

In phase D, fibrous crystalline potassium titanate is produced and its major component is $K_2O.4TiO_2$, which changes into $2K_2O.11TiO_2.2H_2O$ when it is brought into contact with water.

In phase E, fibrous crystalline potassium titanate is obtained and its major component is $K_2O.6TiO_2$.

In phase F, the yield is not fibrous and it is a mixture of noncrystalline potassium titanate and crystalline $K_2O.2TiO_2$.

In phase G, the yield is a mixture of crystalline $K_2O.2TiO_2$ and non-reacted rutile-type titanium dioxide.

Phase W is the most remarkable phase of this invention and whiskers grew on the surface of a lump or pellet. In the lump $K_2O.4TiO_2$ is produced and it changes into $2K_2O.11TiO_2.2H_2O$ when it is brought into contract with water.

The present invention will be illustrated by the following non-limitative Examples.

EXAMPLE 1

A mixture of 124 grams of potassium carbonate, 11 grams of potassium hydroxide and 240 grams of titanium dioxide ($K_2O/TiO_2=\frac{1}{3}$) was triturated and blended with a small amount of water. The so blended mixture was formed into pellets and after drying for twenty four hours, the pellets were calcined at a temperature of 1050° C. When the pellets were taken out from the furnace after 3 hours, the growth of whiskers was observed on the surface of the pellets. The average length of the whiskers was around 7 mm. The total yield of the whiskers was 95 grams.

Chemical analysis indicating the chemical composition of the product to be $K_2O.nTiO_2$ (n=2.5-8).

The X-ray diffraction pattern of the product does not show any diffraction phenomena which could be caused by a crystalline substance. Accordingly, the product is a noncrystalline or amorphous substance.

EXAMPLE 2

Using the same starting materials as in Example 1, calcination was conducted for about 4 hours at a temperature of 1000° C. The growth of fibrous potassium titanate was observed on the surface of the pellets. The average length of the whiskers was 16 mm. Total yield was 120 grams. According to an X-ray diffraction method the product was amorphous.

EXAMPLE 3

Using the same starting materials as in Example 1, calcination was conducted for 3 hours at a temperature of 1100° C. Whiskers of 5 mm. in length grew on the surface of the pellets. All whiskers were collected from the surface and then the remaining parts of the pellets were submitted again to calcination for 3 hours at a temperature of 1100° C. The growth of whiskers of about 5 mm. in length was again observed on the surface of the pellets. Total yield of whiskers was 80 grams.

EXAMPLE 4

According to the same procedure as in Example 1, a mixture of 124 grams potassium carbonate, 240 grams of titanium dioxide and 8 grams of sodium hydroxide was blended, formed into pellets, and then calcined for 3 hours at a temperature of 1050° C. Whiskers were observed on the surface of the solid.

EXAMPLE 5

Effect of the ratio of $K_2O/TiO_2$ in the starting materials was investigated, by using starting mixtures of different ratios. Calcination was conducted for 3 hours at a temperature of 1000° C. These results are shown in Table 1.

Table 1

| Ratio of The Composition of Starting Materials ($K_2O : TiO_2$) | Weight of obtained whiskers (grams) |
| --- | --- |
| 1 : 3 | 15 |
| 1 : 3.5 | 8 |
| 1 : 4 | 6 |
| 1 : 4 | 0.5 |
| 1 : 6 | 0.5 |
| 1 : 8 | 0.1 |

As is clear from the results, product was obtained at a molar ratio of $K_2O/TiO_2$ of 1:2.5 to 1:8. A superior yield being obtained at the ratio of 1:3 to 1:4.

EXAMPLE 6

The same procedure as in Example 4 was repeated except that materials containing sodium or lithium salt were used as starting materials. The results are shown in Table 2.

Table 2

| Composition of starting material ($K_2O : Na_2O : Li_2O : TiO_2$) | | | | Weight of obtained whiskers (grams) |
| --- | --- | --- | --- | --- |
| 1 : 0.01 | : | : 3 | | 15 |
| 1 : 0.1 | : | : 3 | | 9 |
| 1 : | : 0.01 | : 3 | | 10 |
| 1 : | : 0.1 | : 3 | | 4 |

From the above results, it can be seen that a small amount of alkali metal salt other than potassium salt does not influence the production of the fibrous product. Hence, whiskers of potassium titanate can be prepared industrially from inexpensive raw materials.

EXAMPLE 7

Under the same conditions as in Example 4 or 5, the effect of other contaminates in the starting material was investigated. The results are shown in Table 3.

Table 3

| Composition of starting material | | | | | Weight of obtained whiskers |
| --- | --- | --- | --- | --- | --- |
| $K_2O$ | $TiO_2$ | $SiO_2$ | $Al_2O_3$ | $B_2O_3$ | (grams) |
| 1 | 3 | 0.1 | | | 13 |
| 1 | 3 | | 0.1 | | 14 |
| 1 | 3 | 0.5 | 0.5 | | 14 |
| 1 | 3 | | | 0.01 | 10 |
| 1 | 3 | | | 0.1 | 3 |

From the above results, it can be seen that a small amount of impurities which are sometimes found in the starting materials do not influence the production of the fibrous substance except in the case of $B_2O_3$. Thus, inexpensive starting materials which are of practical value to industry can be utilized in the invention process.

EXAMPLE 8

Figure 3:
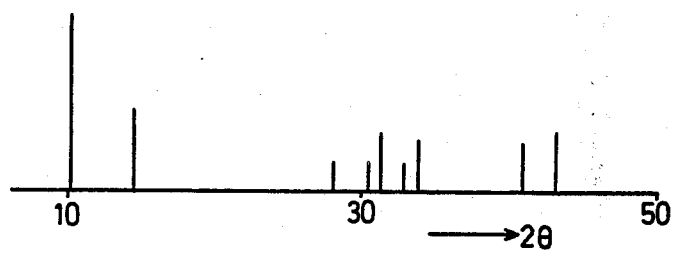
FIG. 3 is an X-ray diffraction pattern of $K_2O.4TiO_2$.
Figure 5:
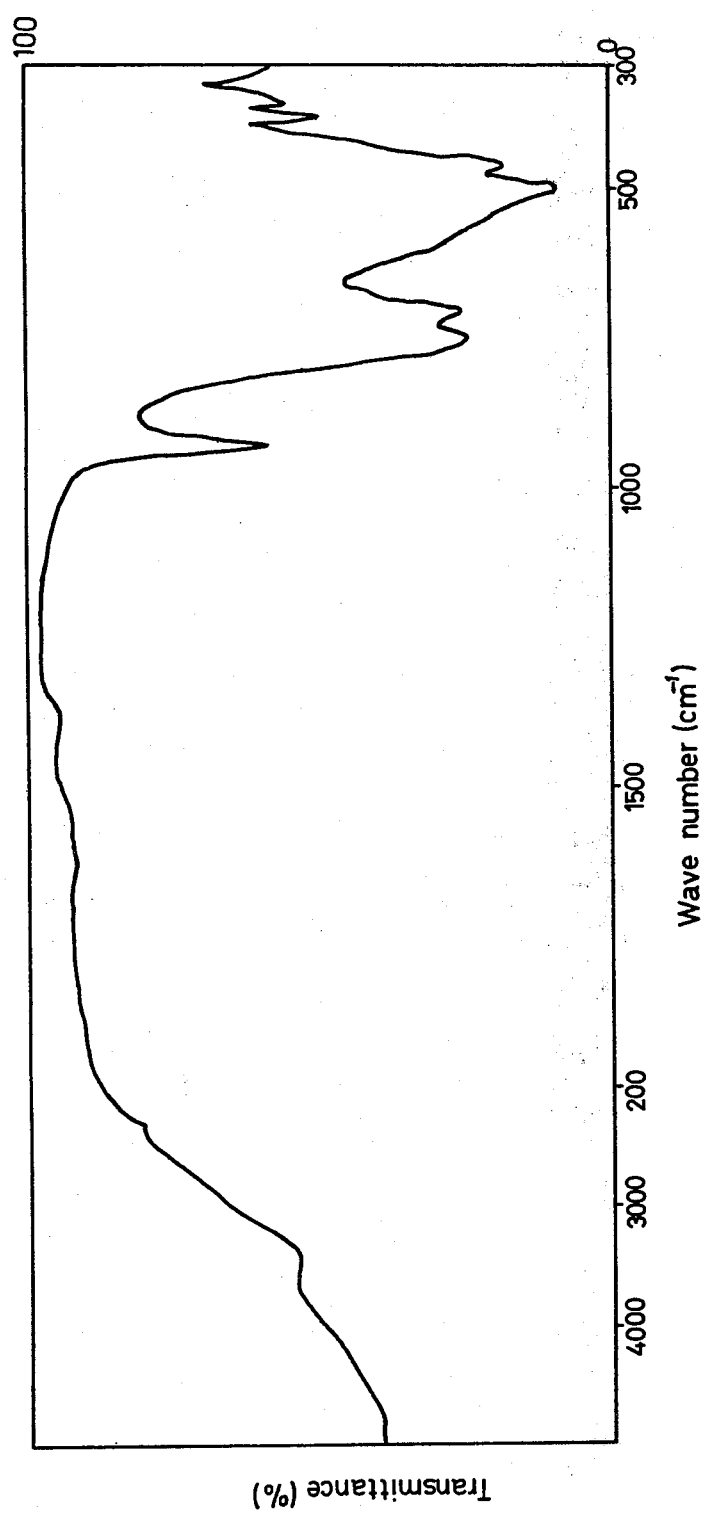
FIG. 5 is an IR-spectrum of $K_2O.4TiO_2$.

By using a microscope, fibers were observed inside the pellets calcined as in Example 1. The average length of the fibers was 100 μm. Some of the fibers from the inside of the pellets were submitted to X-ray diffraction analysis and to IR-spectrometry. The X-ray diffraction pattern and the IR-spectrum of the fibers are shown in FIGS. 3 and 5, respectively. These results show that the fibers are a highly crystalline form of potassium tetratitanate, i.e. $K_2O.4TiO_2$.

After the whiskers of noncrystalline potassium titanate were removed from the surface of the pellets, the pellets were introduced into hot water and 340 grams of the fibers were collected.

Figure 2:
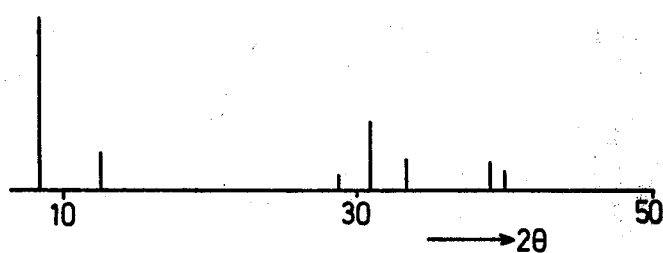
FIG. 2 is an X-ray diffraction of $2K_2O.11TiO_2.2H_2O$.
Figure 4:
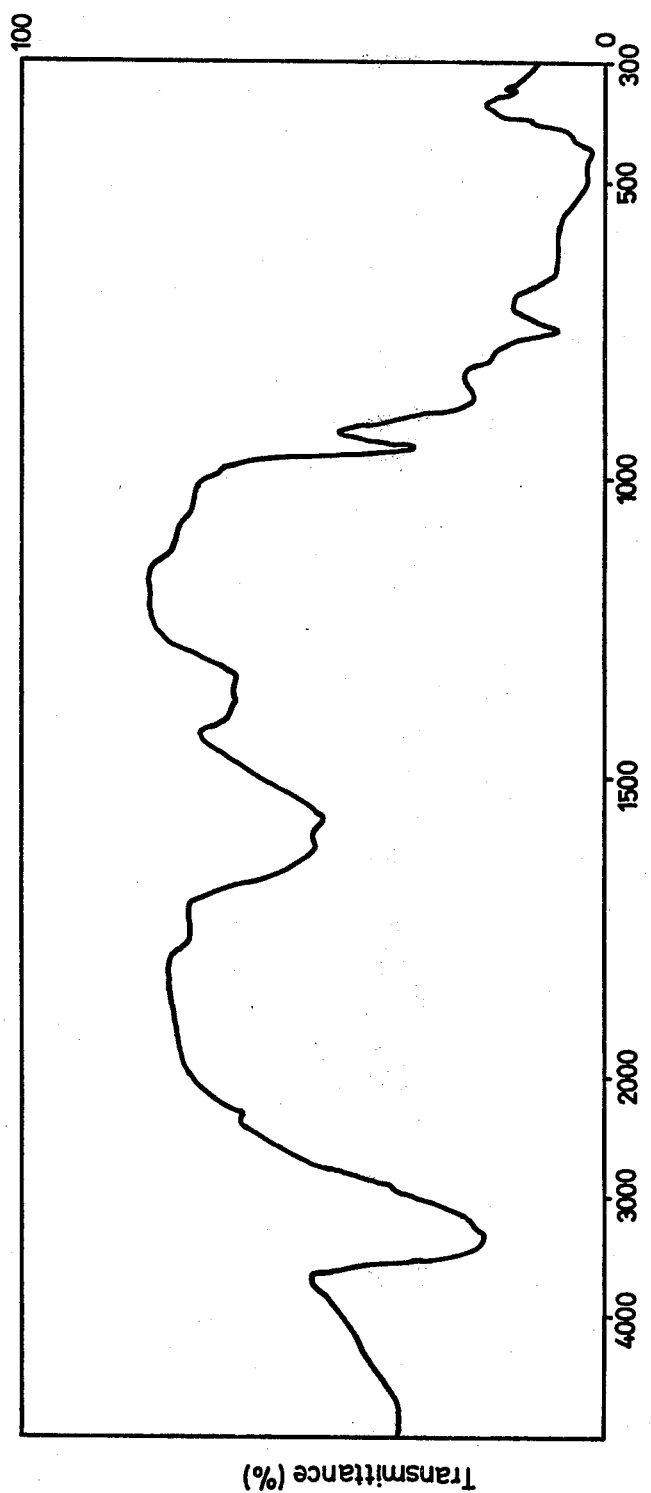
FIG. 4 is an IR-spectrum of $2K_2O.11TiO_2.2H_2O$.
Figure 6:
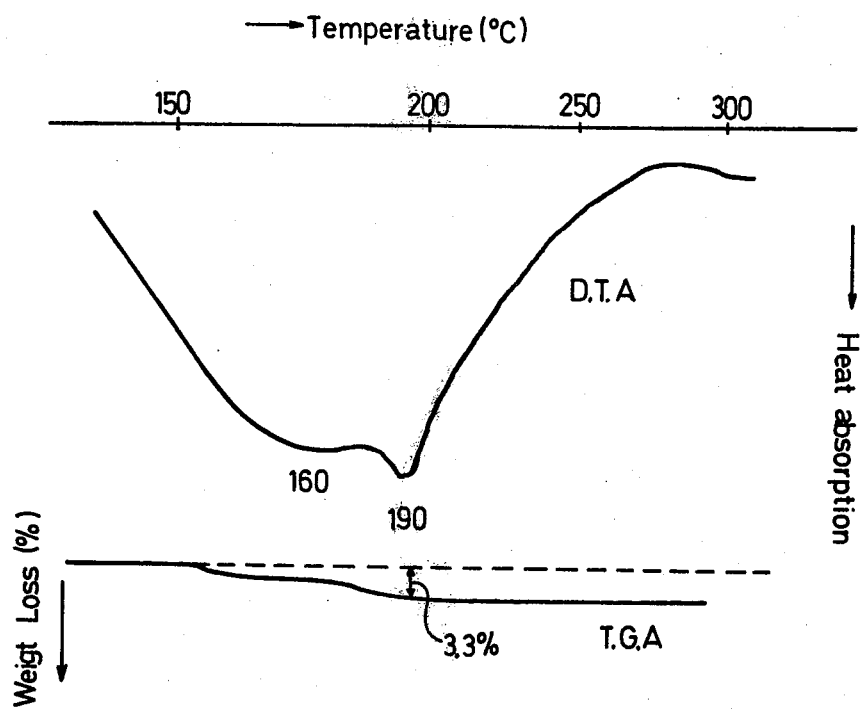
FIG. 6 is a thermogravimetric analysis (TGA) and a differential thermal analysis (DTA) of $2K_2O.11TiO_2.2H_2O$.

According to IR-spectrometry, (FIG. 4), thermogravimetrical analysis (TDA) and differential thermal analysis (DTA), (FIG. 6), the fibrous product thus obtained is potassium titanate hydrate of the formula $2K_2O.11TiO_2.2H_2O$, where X-ray diffraction pattern is shown in FIG. 2 and Table 4.

Figure 7:
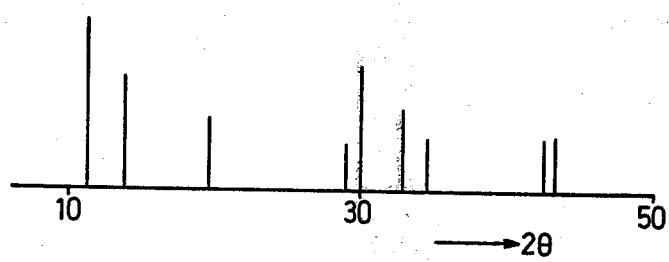
FIG. 7 is an X-ray diffraction pattern of potassium hexatitanate.

Subsequently, these fibers of potassium titanate hydrate were calcined in air for 30 minutes at a temperature of 1000° C. to obtain potassium hexatitanate ($K_2O.6TiO_2$), which was confirmed by its X-ray diffraction pattern as shown in FIG. 7. The purity of the product proved to be extremely high.

Table 4

| Distance (A) | Angle (deg.) | Intensity |
| --- | --- | --- |
| 10.896 | 8.115 | vs |

Table 4-continued

| Distance (A) | Angle (deg.) | Intensity |
| --- | --- | --- |
| 9.7203 | 9.090 | m |
| 7.1378 | 12.390 | m |
| 5.7488 | 15.400 | vw |
| 5.4283 | 16.315 | w |
| 4.5322 | 19.570 | w |
| 3.5778 | 24.865 | w |
| 3.1089 | 28.690 | vw |
| 2.9172 | 30.620 | m |
| 2.7009 | 33.140 | vw |
| 2.6689 | 33.550 | vw |
| 2.5238 | 35.540 | m |
| 2.1809 | 41.365 | w |
| 2.1276 | 42.450 | vw |
| 1.9829 | 45.715 | w |
| 1.8919 | 48.050 | vw |
| 1.8622 | 48.865 | vw |
| 1.6263 | 56.540 | vw |

Note:
vs: very strong (more than 75%)
s: Strong (55-75%)
m: Medium (35-55%)
w: Weak (15-35%)
vw: Very Weak (less than 15%)

EXAMPLE 9

A mixture of 125 grams of potassium carbonate, 11 grams of potassium hydroxide and 400 grams of titanium dioxide ($K_2O/TiO_2 = 1/5$) was triturated and kneaded with a small amount of water. The so kneaded mixture was formed into pellets. After drying for twenty-four hours, the pellets were calcined at a temperature of 1200° C. for 3 hours. Whiskers were observed on the surface of the pellets; however, the length thereof is around 500 μm and hence the collection of the whiskers was very difficult. According to microscopic observation, fibers were observed inside the remaining part of the pellets. The fibers from inside the pellets were submitted to X-ray diffraction analysis which showed that the product inside the pellets was crystalline potassium hexatitanate ($K_2O.6TiO_2$).

We claim:

1. A process for preparing fibrous potassium titanate hydrate comprising kneading a mixture of one or more potassium compounds selected from the group consisting of potassium carbonate, potassium hydroxide, potassium sulfate, potassium nitrate, and potassium chloride, and one or more titanium compounds selected from the group consisting of titanium dioxide and titanium hydroxide with a ratio of potassium atom to titanium atom of between 2:2.5 to 2:8, forming the thus kneaded mixture into lumps or pellets, calcining the lumps or pellets at a temperature of from about 950° C. to 1150° C., recovering the bulk of the pellets after removing the whiskers produced on the surface thereof and then treating the thus recovered bulk in water for at least 30 minutes to form fibrous crystalline potassium titanate hydrate of the formula $2K_2O.11TiO_2.2HO_2$.

2. Fibrous crystalline potassium titanate of the formula $2K_2O.11T.O_2.2H_2O$ prepared by the process of claim 1.

3. A process for preparing fibrous potassium hexatitanate which comprises:

kneading a mixture of one or more potassium compounds selected from the group consisting of potassium carbonate, potassium hydroxide, potassium sulfate, potassium nitrate, and potassium chloride, and one or more titanium compounds selected from the group consisting of titanium dioxide and titanium hydroxide with a ratio of potassium atom to titanium atom of between 2:2.5 to 2:8, forming the thus kneaded mixture into lumps or pellets, calcining the lumps or pellets at a temperature of from about 950° C. to 1150° C., recovering the bulk of the pellets after removing the whiskers produced on the surface thereof and then treating the thus recovered bulk in water to yield fibrous crystalline potassium titanate hydrate of the formula $2K_2O.11TiO_2.2H_2O$ and subjecting the potassium titanate hydrate to thermal treatment at a temperature of from about 500° to 900° C. to form crystalline potassium hexatitanate.

* * * * *